United States Patent [19]
Gretz

[11] Patent Number: 6,093,890
[45] Date of Patent: Jul. 25, 2000

[54] MOUNTING DEVICE

[75] Inventor: Thomas J. Gretz, Clarks Summit, Pa.

[73] Assignee: Arlington Industries, Inc., Scranton, Pa.

[21] Appl. No.: 09/178,402

[22] Filed: Oct. 24, 1998

Related U.S. Application Data

[63] Continuation-in-part of application No. 08/935,144, Sep. 22, 1997, abandoned.

[51] Int. Cl.[7] .................................................... H01H 9/02
[52] U.S. Cl. ............................ 174/58; 174/48; 174/50; 220/3.8; 439/535; 361/730
[58] Field of Search .................................. 174/48, 50, 58; 220/3.8, 4.02; 439/535; 361/730

[56] References Cited

U.S. PATENT DOCUMENTS

| | | | |
|---|---|---|---|
| 4,000,874 | 1/1977 | Finley et al. | 248/27.1 |
| 4,546,793 | 10/1985 | Stupecky | 137/554 |
| 5,448,011 | 9/1995 | Laughlin | 174/48 |

*Primary Examiner*—Kristine Kincaid
*Assistant Examiner*—Dhiru R. Patel

[57] ABSTRACT

A mounting device for primarily for low voltage wall mounting in which can be mounted communication cable, television cable, fiber optics, or similar low voltage communication devices. The device has a frame, an integral reinforcing flange fitted into a rectangular hole on the wall, and two flags which are rotated by front mounted screws for grabbing the rear surface of the wall and serve to tighten the mounting device securely to the wall.

9 Claims, 11 Drawing Sheets

MOUNTING DEVICE

This is a continuation-in-part of application Ser. No. 08/935,144, filed Sep. 22, 1997, and now abandoned.

The present invention relates to a mounting device especially for low voltage wall mounting.

When communication cable, television cable, fiber optics or similar low voltage communication is added to an existing wall in a building, there are several ways of doing it. One is you can punch a hole in the wall and insert the outlet box and bring the cable or fiber optic through the box. Another way to do it is to use a frame plate made of metallic material which includes cutting a hole in the wall and installing the plate by bending part of the assembly.

SUMMARY OF THE INVENTION

The present invention uses a plastic mounting device having an open window plate extending around an opening in a building wall with an integral right-angle flange or device wall extending into the building wall. The device has two turning screws adapted to turn flags which have been inserted into the hole to grab the far side of the building wall and rotate the screws to snug the plate and flange to the wall. The flange or device wall has a rectangular outside periphery that permits a simple rectangular cut to be made in the building wall for the ready fitting of the device. The flags are located on opposite sides of the plate near the center of two opposite ends so that the holding forces are applied in the most desired direction without having such forces being applied at opposite corners.

DESCRIPTION OF THE PREFERRED EMBODIMENT

Figure 1:
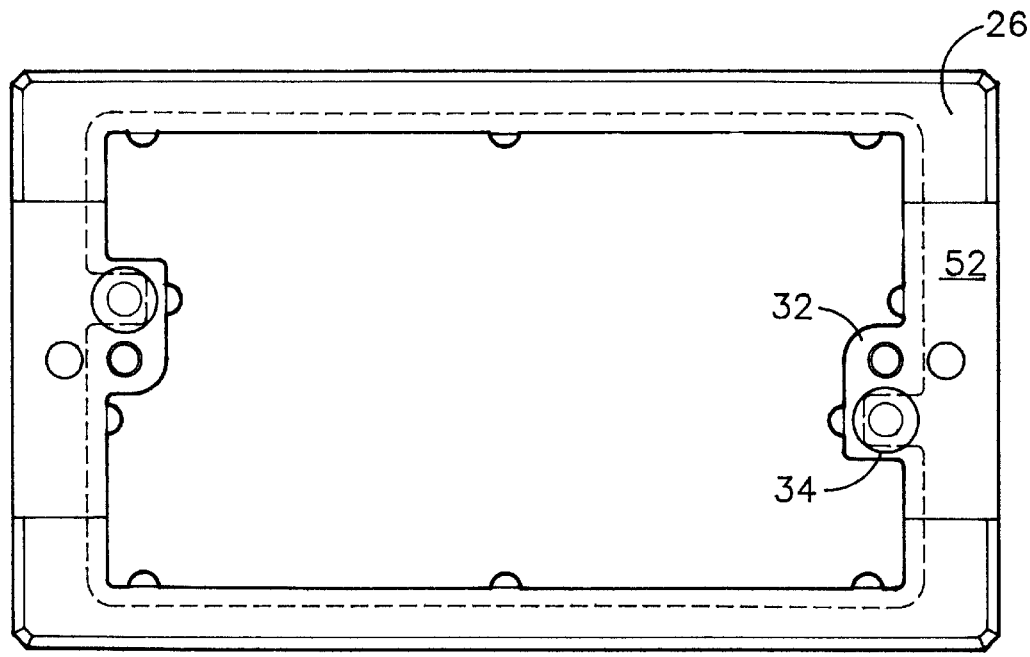
FIG. 1 is a plan view of mounting device.
Figure 2:
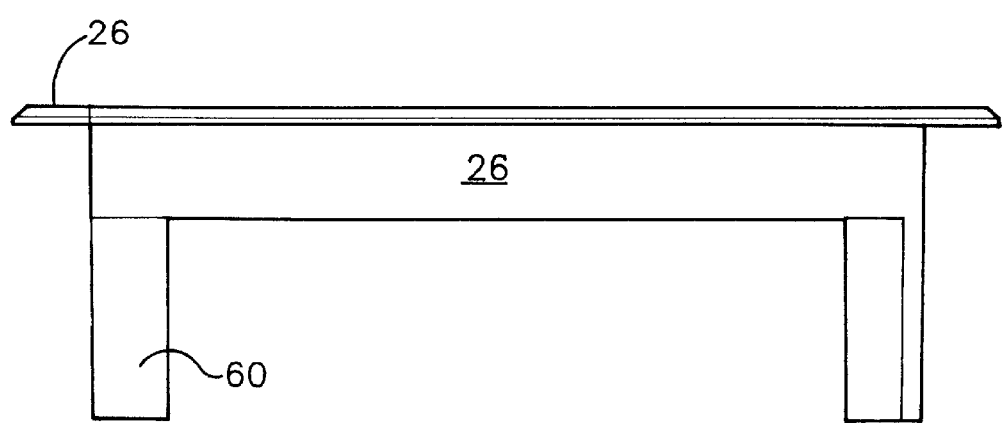
FIG. 2 is a side view of the mounting device.
Figure 3:
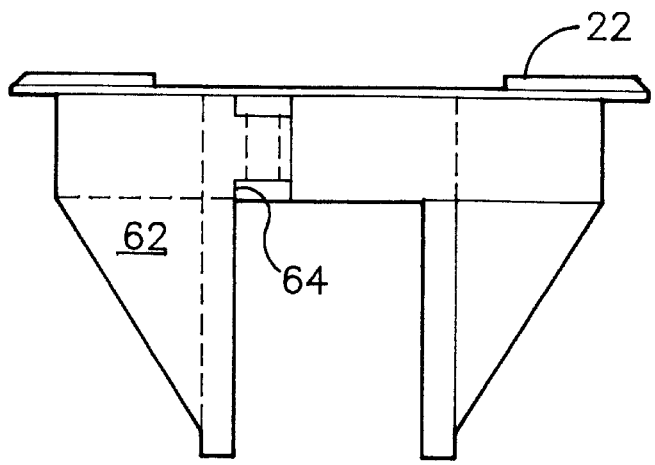
FIG. 3 is a an end view of the mounting device.
Figure 4:
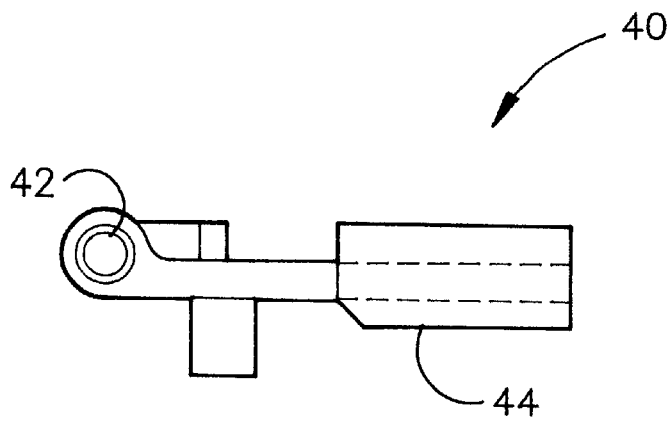
FIG. 4 is an end view of the flag.
Figure 5:
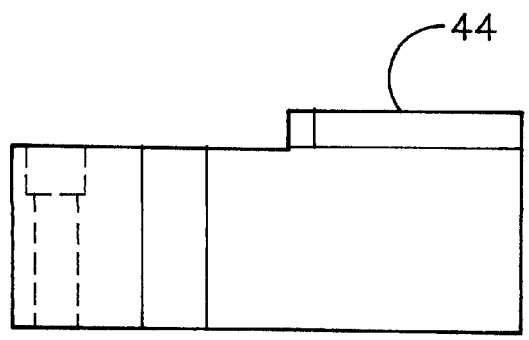
FIG. 5 is a side view of the flag.
Figure 6:
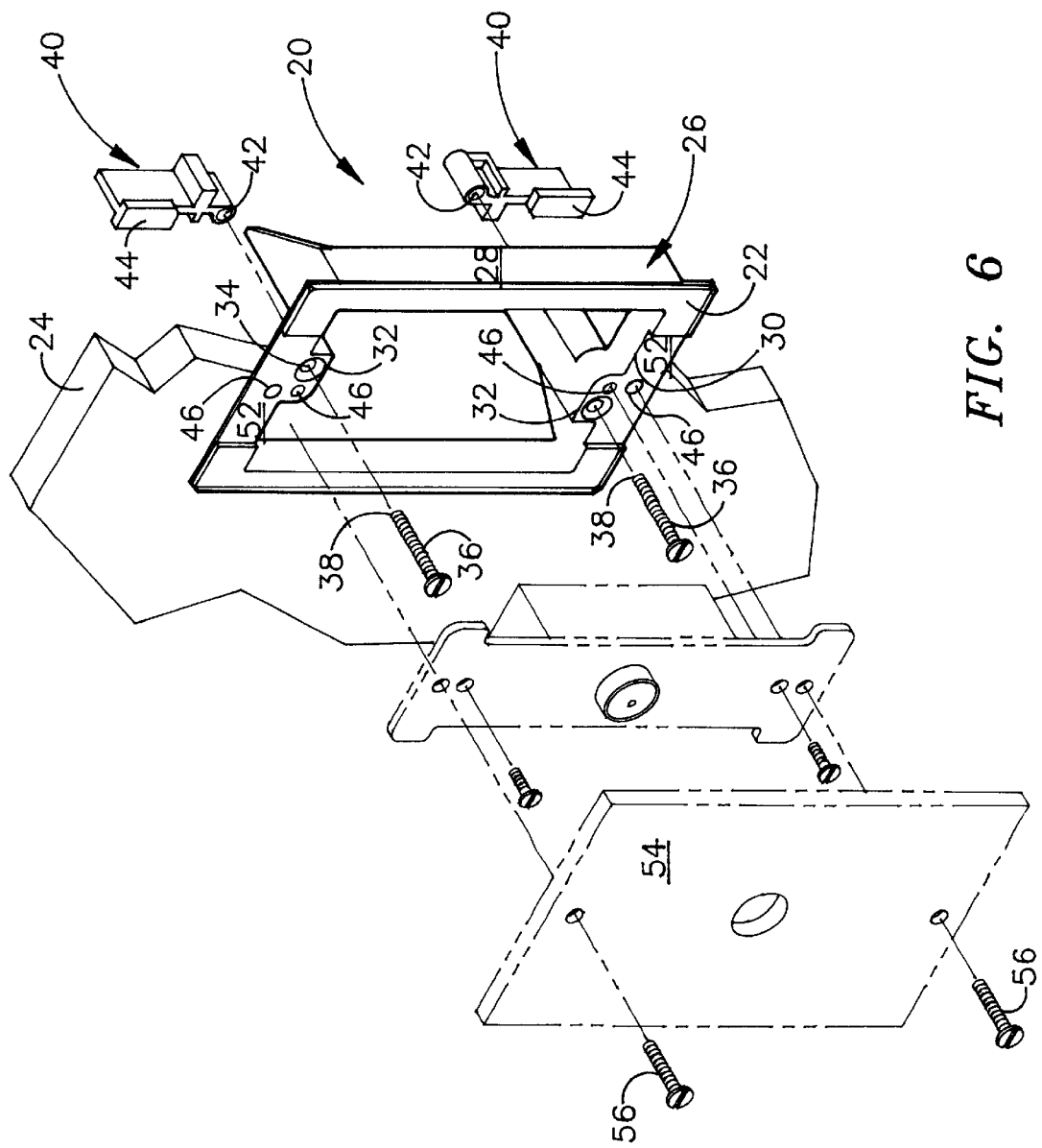
FIG. 6 is an exploded perspective view of the mounting device in a wall.

With reference to FIG. 6, there is shown an exploded view of the invention and the relationship it has with a building wall when installed. There is shown a plastic mounting device 20 having an open window plate 22 adapted to extend around an opening in a wall 24. Integral with the open window plate 22 is a flange or device wall 26 extending at right angles to the inside periphery of the plate which is adapted to extend into the opening in the building wall 24. It is to be noted that flange or device wall 26 may extend deeper into the building wall and have the inside enclosed (not shown) to provide a box.

The right angle of the window plate 22 and flange 26 extend around the mounting device on all four sides and serve as a structural stiffener.

Figure 10:
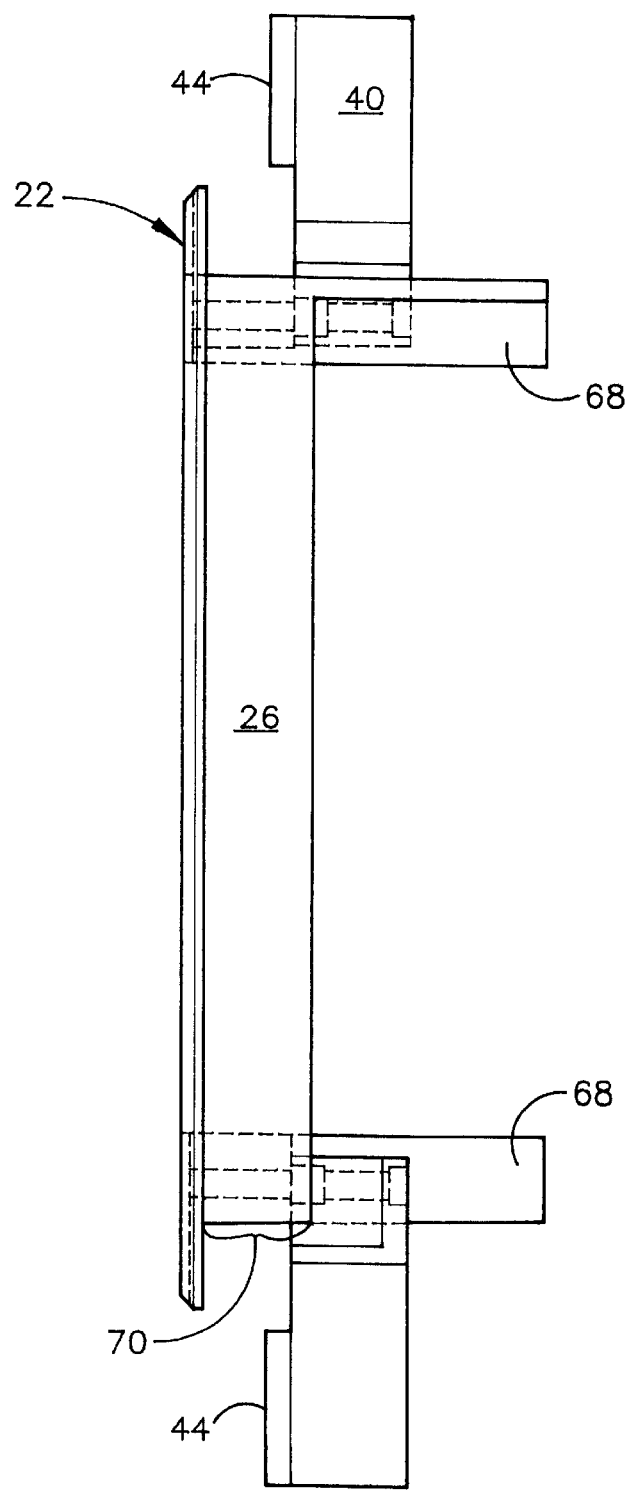
FIG. 10 is a side view of FIG. 9.

The outside periphery 28 of the flange 26 is perfectly rectangular in shape as best seen in FIG. 10. This permits an opening to be made in the building wall 24 by simply cutting a rectangular hole with a minimum of effort and dropping the mounting device 20 into the hole. The outside periphery 28 extends into the opening and is usually of a length approaching the thickness of a standard wallboard but may be deeper as indicated above.

Figure 9:
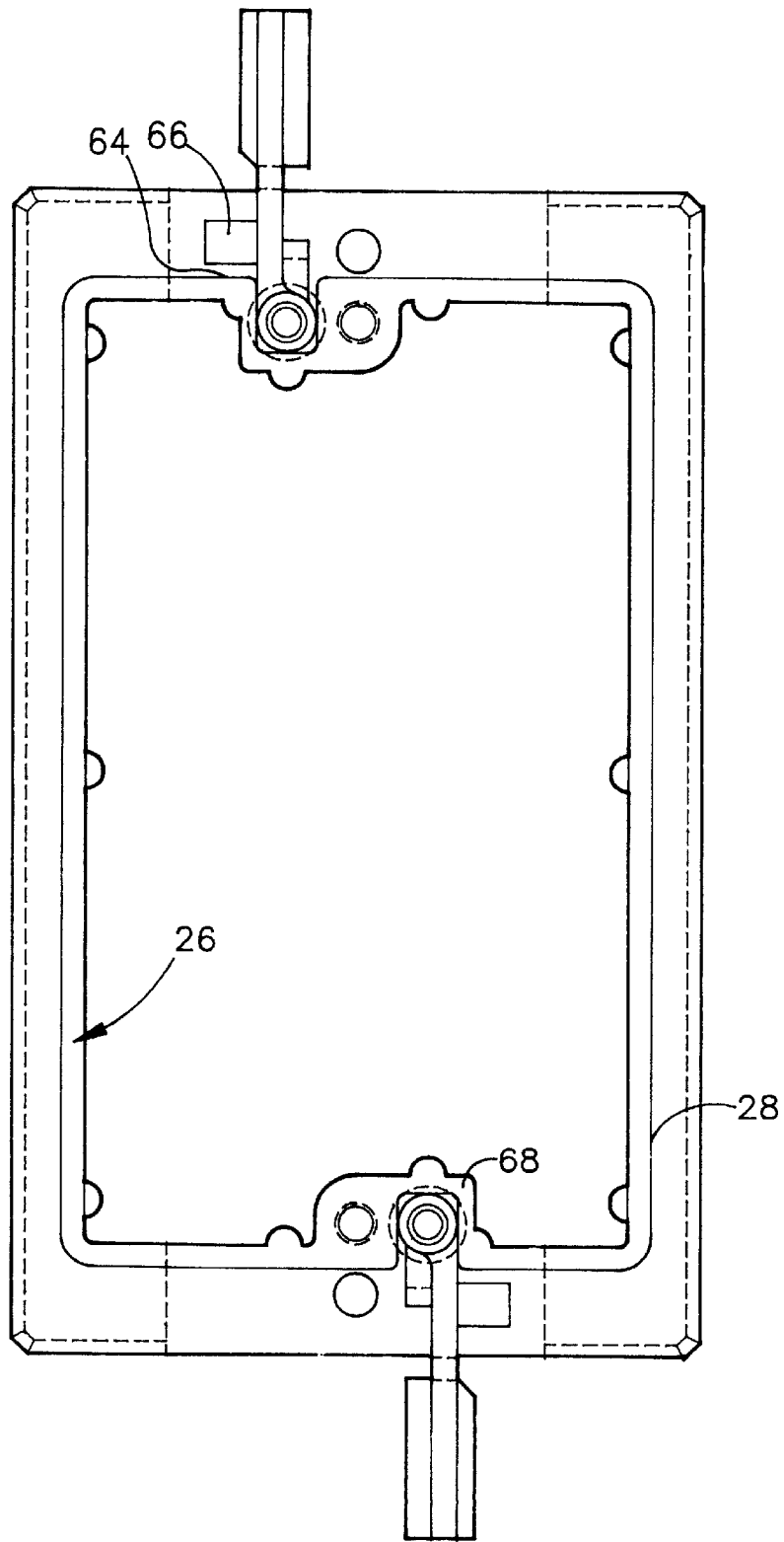
FIG. 9 is a back plan view of the mounting device with flags extended.

At an inside periphery 30 of plate 22 and integral therewith are mounting blocks 32. It is to be noted that the mounting blocks 32 are located on opposite sides of said mounting device and in the approximate center of the side. This is best seen in FIG. 9 where the mounting block is located in the middle half of the side. The reason for this will be discussed later.

Within each of the mounting blocks 32 are turning screw holes 34 each of which contain turning screws 36 which freely rotate in the holes 34 that are smooth and not threaded. Each turning screw 36 has a leading edge 38. The leading edge 38 is adjustably carried by the mounting device 20 to flags 40. Each flag 40 has a hole 42 which receives the leading edge 38 of the screws 36 that are threaded therein with a friction fit.

After a rectangular hole has been cut in building wall 24, the mounting device 20 is inserted therein and the two turning screws 36 are turned clockwise to flip flags 40 into position. As the turning screws continue to turn, they draw the pads 44 to the inside surface of wall 24 to hold the plastic mounting device 20 firmly in position.

The advantage of having the mounting blocks 32 in the middle half of the window is so that the forces which firmly hold the mounting device 20 in position are balanced. This is to be compared to having the force of the turning screw 36 applied at the corners such as would be the case of standard work boxes.

After the mounting device has been firmly fixed in position, various other device holders may be screwed into holes 46. As shown in phantom lines in FIG. 6 a co-axial cable box 48 is held in position by screws 50 with the ends of the box being received in recesses 52. Overlaying the mounted device is cover plate 54 which is held in position by screws 56. Other similar devices may also be mounted as the co-axial cable boxes are merely representative of one type.

Figure 7:
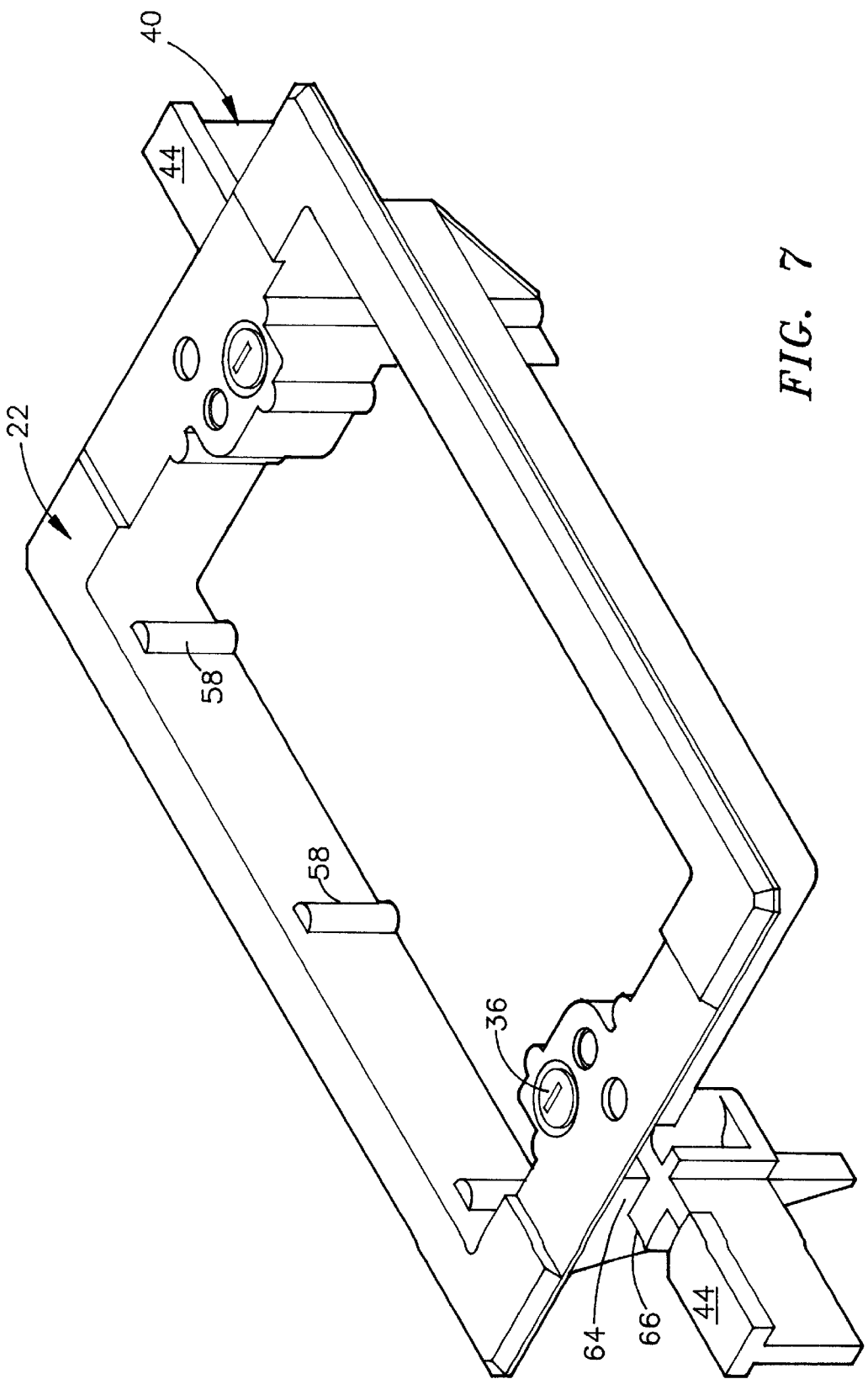
FIG. 7 is a perspective view of the mounting device.
Figure 8:
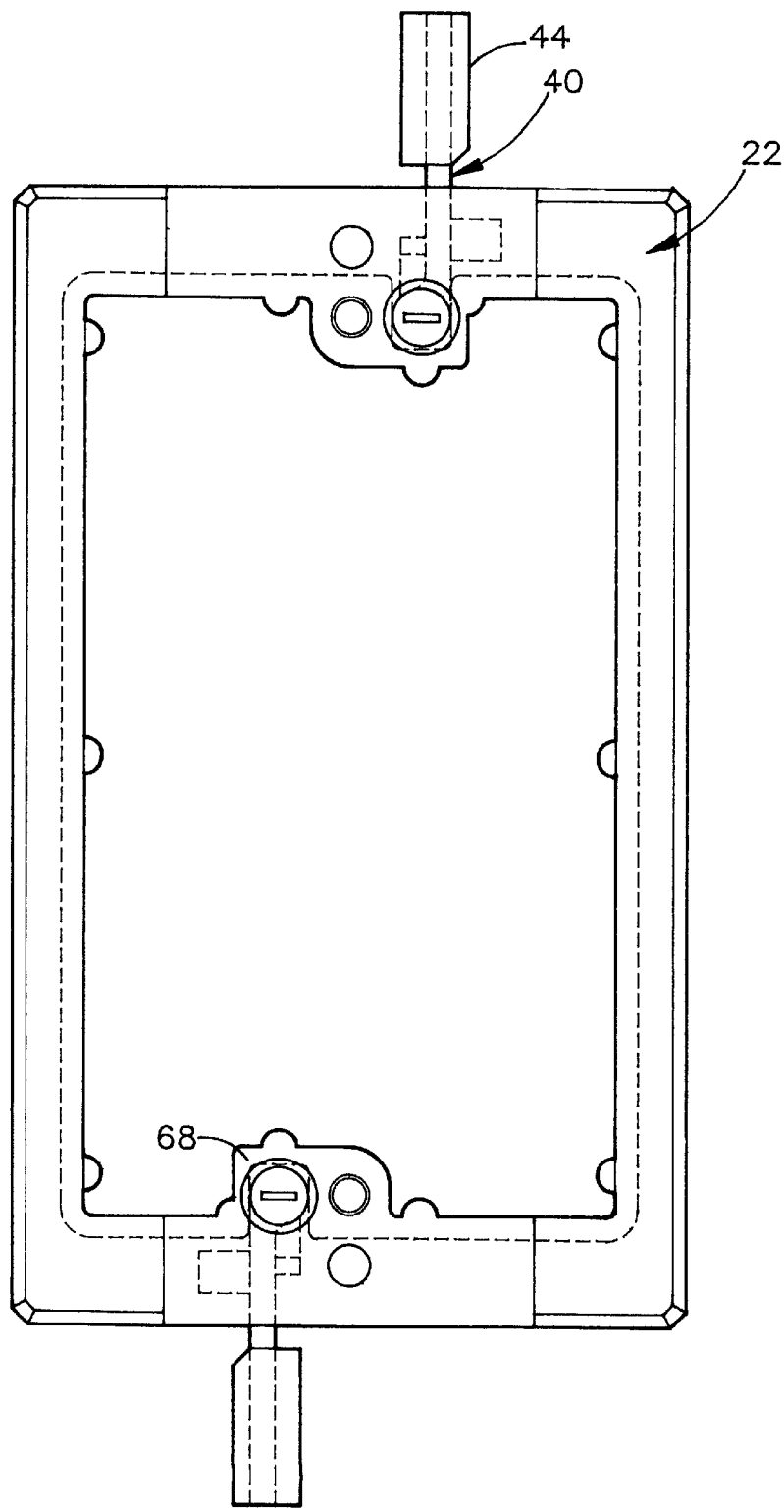
FIG. 8 is a front plan view of the mounting device with flags extended.

Surrounding the inside periphery of flange 26 are a series of parallel reinforcing ridges 58 which help to stiffen the wall of the flange as best seen in FIG. 7 and also may provide an ejector for removing the member from a mold after molding.

Figure 11:
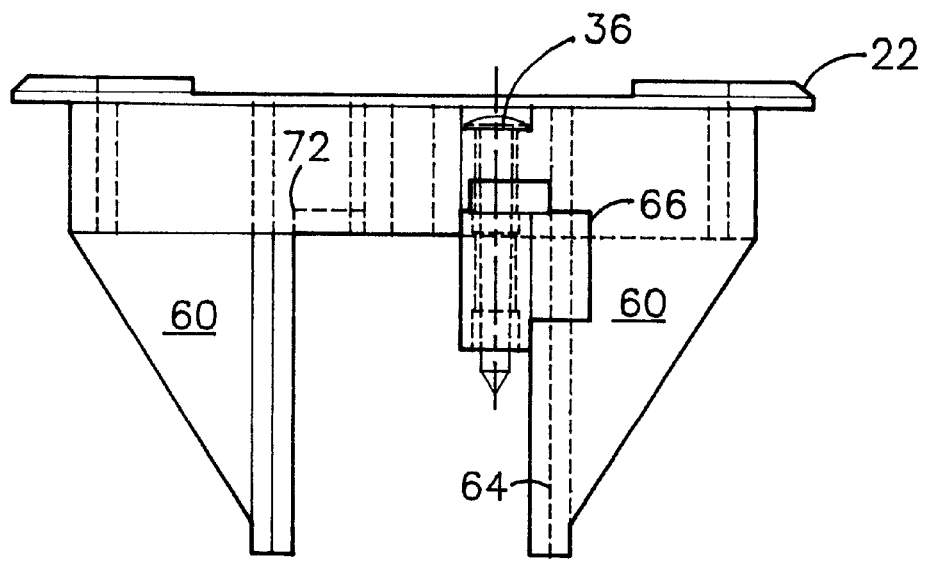
FIG. 11 is an end view of FIG. 10.
Figure 12:
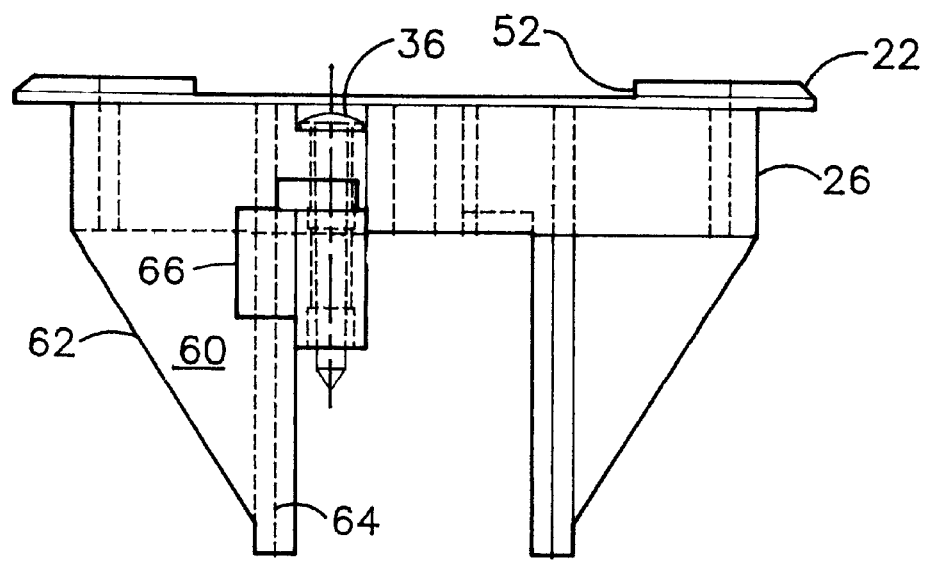
FIG. 12, is a view of the opposite end of FIG. 10 from that of FIG. 11.
Figure 13:
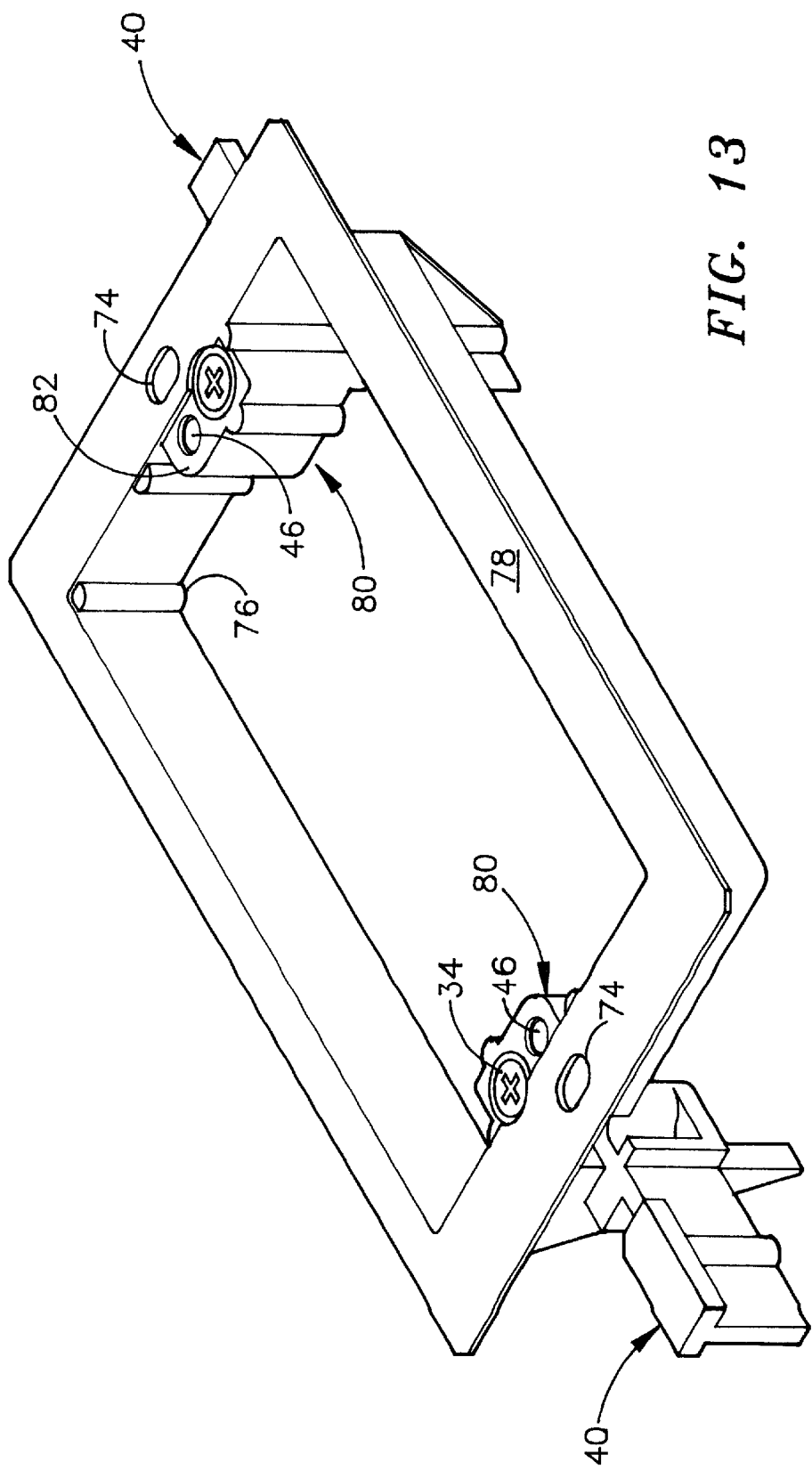
FIGS. 13 to 19 show another embodiment similar to the embodiment shown in FIGS. 7 and 1 to 5.
Figure 15:
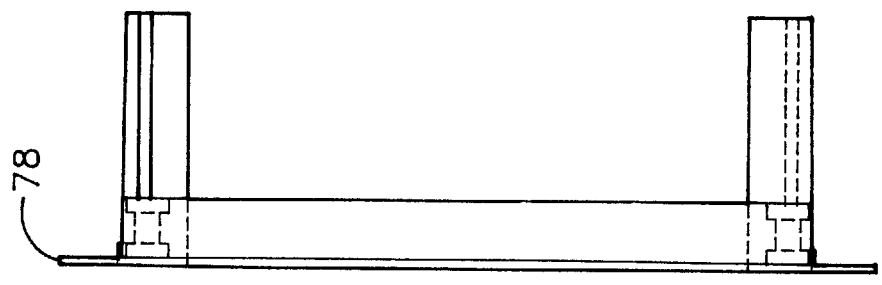
Figure 14:
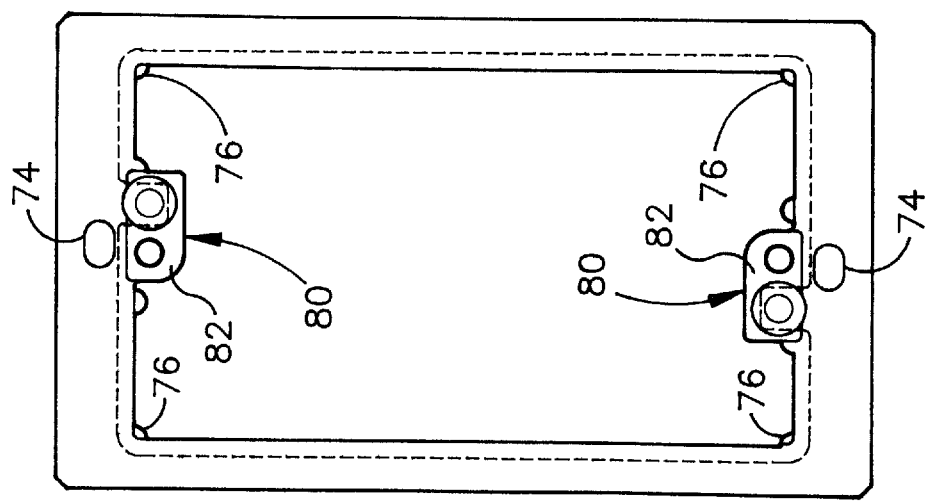
Figure 18:
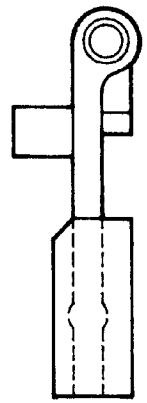
Figure 19:
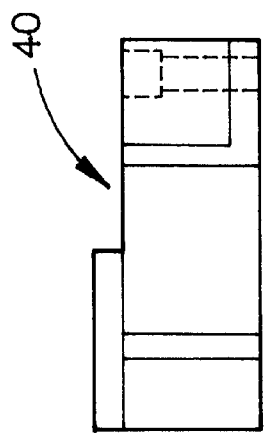
Figure 16:
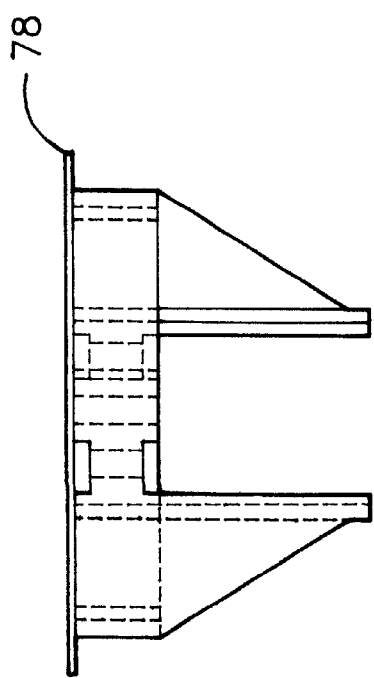
Figure 17:
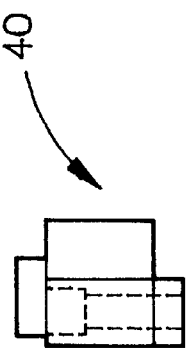

As best seen in FIGS. 10 through 12, it is seen that the flange or device wall 26 has an extension which is extended inward beyond the thickness of the plaster board or sheetrock wall 24 by guidepost 60. The guidepost has a triangular gusset 62 to assist in holding the post in position and a sliding surface 64. The flag 40 has a slide member 66 which moves along side surface 64 as the screw 36 is tightened. While the triangular gusset 62 is of the same thickness and an extension of the flange 26, it also has an integral flange 68 that is an inward extension of the mounting block 32. When the mounting device 20 is first inserted in an opening in the wall, the flags 40 are free to swing within the opening. Once screw tightening pressure is applied to turning screw 36, the flags flip in a direction of the turning screw until the slide member 66 is arrested by the sliding surface 64. Continued tightening of the screw causes the flags 40 to be pulled toward the window plate 22 which is fastened securely to the wall from the inside by the flange 40. It is to be noted that the flange 26 extends from the back face of the window plate 22, a distance approximating the thickness of the wall in which the mounting device 20 is secured and is best seen in FIG. 10 but may extend deeper. The pads 44 extends beyond the body of the flag 40 in a direction towards the rear face of the window plate so that substantially all of the retaining pressure from the flag is carried by the surface of the pad pushing against the rear surface of the wall 24.

As seen in FIG. 11, the slide member 66 can be drawn in the direction of the window plate until the pad 44 contacts the wall. Since some drywall may have a thickness as thin as ¼ inch, the wall end of the flag may be pulled toward the wall as far as the notch 72 for thin walls.

With reference to FIGS. 13 to 19 there is shown the best preferred embodiment of the invention.

This embodiment is an importantly modified version of the other embodiment with four major improvements.

First, slotted hole 74 has a height of approximately 0.156 inches and a width of approximately 0.248 inches or more. This arrangement permits the use of wallplates or devices whose holes do not quite line up if merely a circular hole is utilized.

Second, the reinforcing ridges and injector knock-out 76 are moved to the corners of the open window. This removes the interference with some cable boxes or other devices that are fastened to the mounting device.

Third, the embodiment has a window plate 78 whose thickness is only approximately 0.025 inches to 0.035 inches and preferably approximately 0.030 inches. This permits a mounting device that is usually hidden when covered with a face plate.

Fourth, mounting block 80 which contains hole 46 but not slotted hole 74 has an outer face that is below the outer surface of the window plate 78 by a distance from approximately 0.025 to approximately 0.040 inches and preferably approximately 0.030 inches to approximately 0.035 inches. This permits face plates or other devices to be utilized so that the mounting device is completely covered by the face plate.

While there has been illustrated and described particular embodiments of the present invention, it will be appreciated that numerous changes and modifications will occur to the those skilled in the art, and it is intended in the appended claims to cover all those changes and modifications which fall within the true spirit and scope of the present invention.

What is claimed is:

1. A plastic mounting device comprising:

an open window plate having an inside periphery and adapted to extend around an opening in a building wall;

top and bottom sides of said open window plate each having a middle half of said side;

a flange extending at right angles to the inside periphery of said open window plate and adapted to extend into the opening in the wall;

said flange having an outside periphery which is rectangular in shape;

mounting blocks mounted on said inside periphery of said open window plate within said middle half of said top and bottom sides thereof;

turning screw holes located in each of said mounting blocks;

a threaded screw having a leading end located in each of said turning screw holes;

separate individual flags located adjacent to each of said mounting blocks and held in position by said leading edge of said turning screws for tightening said open window plate to said wall;

a guide post located adjacent each of said flags;

a sliding surface on each of said guide posts;

a slide integral with each of said flags for sliding along said sliding surface; and a hole in each of said flags for receiving with a friction fit said leading end of said turning screws.

2. The mounting device of claim 1 wherein said open window plate has centrally located opposite sides holes for the mounting of face plates.

3. The mounting device of claim 1 wherein said open window plate is rectangular.

4. The mounting device of claim 1 wherein said flags are free to fall within said open window plate prior to being tightened.

5. The mounting device of claim 1 wherein said open window plate and said flange are integral with each other and extend around the entire open window plate to provide structural stiffness.

6. The mounting device of claim 1 wherein said open window plate has a thickness of from approximately 0.025 inches to approximately 0.035 inches.

7. The mounting device of claim 1 wherein said open window plate has a thickness of approximately 0.030 inches.

8. The mounting device of claim 1 wherein said mounting blocks are recessed from the outer surface of said open window plate by a distance from approximately 0.025 inches to approximately 0.040 inches.

9. The mounting device of claim 1 wherein said mounting blocks are recessed from the outer surface of said open window plate by a distance from approximately 0.030 inches to approximately 0.035 inches.

* * * * *